June 21, 1938.  H. L. DUNCAN  2,121,560
VARIABLE TIMING DEVICE
Filed Aug. 19, 1935  2 Sheets-Sheet 2

INVENTOR
Herbert L. Duncan,
BY
ATTORNEYS

Patented June 21, 1938

2,121,560

UNITED STATES PATENT OFFICE 2,121,560

VARIABLE TIMING DEVICE

Herbert L. Duncan, Highland Park, Mich., assignor of one-half to Lewis P. Threlkeld, Detroit, Mich.

Application August 19, 1935, Serial No. 36,782

18 Claims. (Cl. 123—90)

This invention relates to internal combustion engines and has for its object to provide an improved valve timing mechanism which is variable with speed and which is quickly responsive to changes in speed without chattering of the train of mechanism.

It has been noted that when a governor as for instance of the centrifugal weight type quickly changes speed there is a tendency to set up vibrations in the weight carrying shaft which may arise from the weights themselves or from the finally driven parts toward vibrations which is very pronounced at certain speeds. It is, therefore, an object of this invention to provide a means operative between a crankshaft and its camshaft including variable valve timing means and a vibration damping drive connection therebetween which is closely associated in such manner that these vibrations are damped thereby giving quietness and prolonging the life of the parts of the train.

More specifically it is an object of this invention to provide a valve timing mechanism with means for varying the timing in accord with crankshaft speed as opposed to the slower cam shaft speed and to associate with this means at the crankshaft a further means for damping vibrations which cause noise and wear at certain speeds.

Another object is to provide a valve timing means as described and means for varying the ignition timing.

Another object is to provide a valve timing mechanism and an ignition timing mechanism both variable according to engine speed, the vibration damping connection referred to serving also as a means for damping possible vibrations in the ignition timing train.

A further object of the invention is to provide a valve timing and an ignition timing mechanism variable in response to engine speed in combination with means for modifying both of these mechanisms in accord with engine load as represented by inlet manifold vacuum.

More specifically it is an object to provide a crankshaft, a relatively rotatable driving member connected to said shaft from which ignition and valve operating mechanisms are driven directly from said crankshaft and by means of which both ignition and valves may be varied as to timing according to a combination of speed and loading.

Other objects and advantages will become hereinafter more fully apparent as reference is had to the accompanying drawings wherein my invention is illustrated by way of example and in which—

Figure 1:
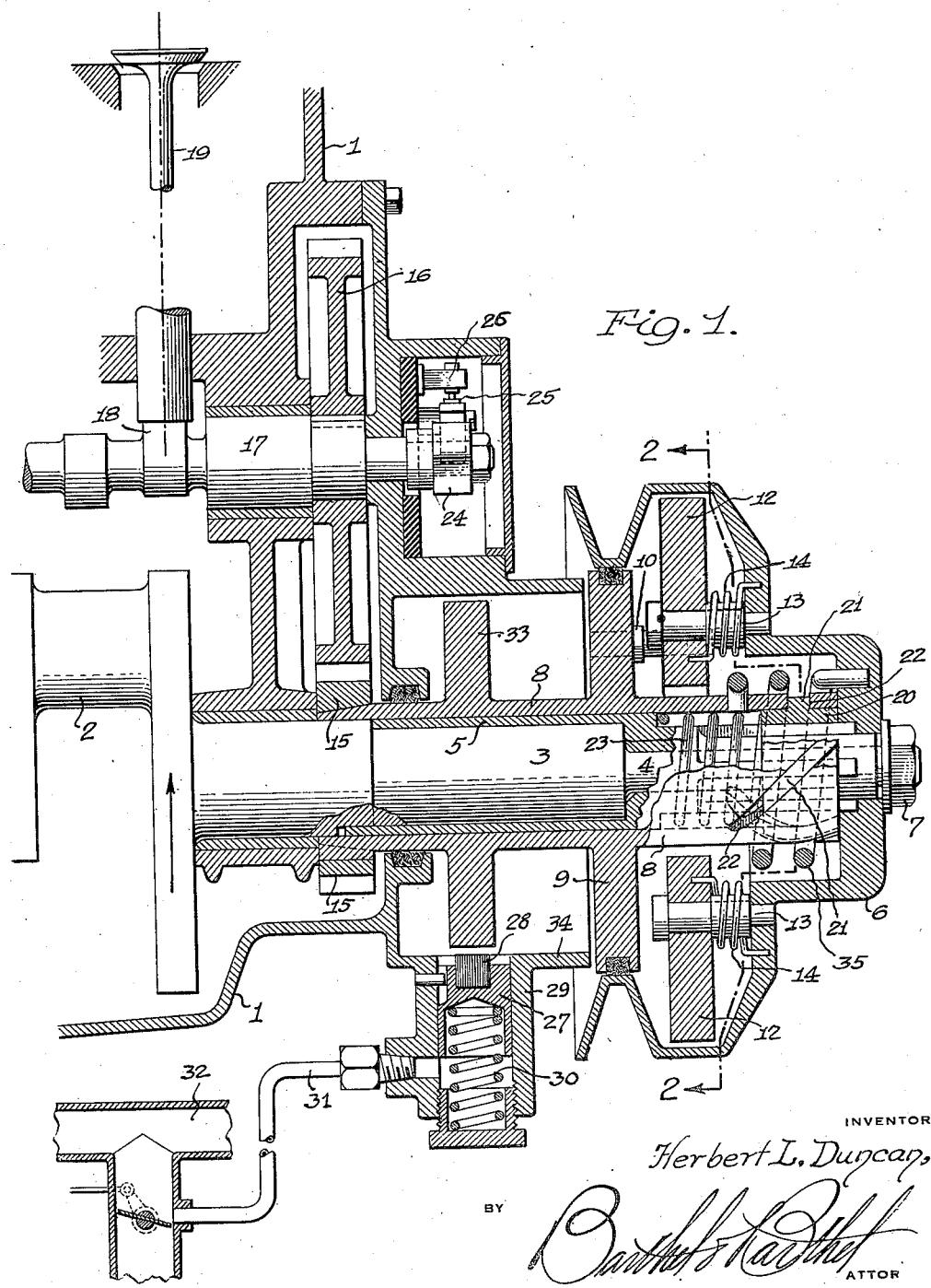
Figure 1 is a vertical section of a portion of an engine taken axially of the crankshaft and showing my invention applied thereto.

More particularly, 1 indicates an engine crank case in which is journalled a crankshaft 2. Rotative with the crankshaft 2 is a stub shaft 3 having a reduced portion 4. A splined sleeve 5 encompasses the shaft 3, 4, the spline thereof engages corresponding teeth in the housing 6. The shaft 4 extends through the housing 6 and a nut 7 is threadable thereon so that the housing 6 rotates with the crankshaft 2.

A sleeve 8 encompasses and is rotatable with respect to the sleeve 5. Integral with the sleeve 8 is a disc 9 into which a plurality of pins 10 are fixedly secured. These pins each ride in a slot 11 cut in each of a series of weights 12 each pivotally mounted on pins 13 fixed in the casing 6. A spring 14 about each pin 13 is anchored to the casing 6 at one end and to a weight 12 at its other end. Two of these springs urge the weights outwardly while the other two urge the weights inwardly. Fixedly secured to the sleeve 8 is a gear 15 in engagement with a larger gear 16 which drives a cam shaft 17 having cams 18 for opening the valves 19.

As the weights 12 under the centrifugal force of increasing rotation swing outwardly about their pivots 13 the pins 10 move in their slots causing relative rotation of the sleeve 8 and hence cam shaft 17 with respect to the crankshaft 2. In order that the weights 12 will swing outwardly to a degree proportionate to crankshaft speed a spring 35 is anchored at one end to the casing 5 and at its other end to the sleeve 8, thus yieldingly resisting all swinging of the weights. The centrifugal force developed, therefore, may be said to act in accompaniment with two spring means one of which reinforces the force and the other opposes the force. Due to this spring balanced condition the weights do not come to an immediate fixed radial distance following a rapid acceleration of the crankshaft and there is also a possible vibratory effect through the shafts due to the action of the cams against the valves at certain speeds so that a vibration damping means is desirable.

Figure 2:
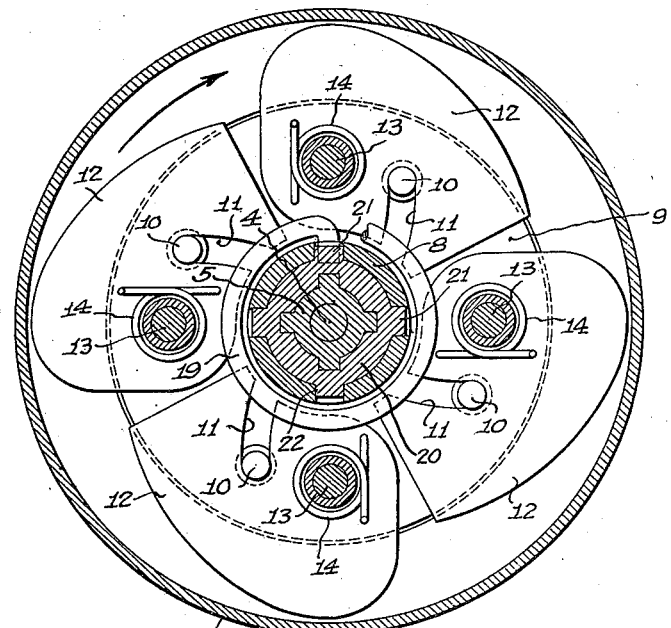
Fig. 2 is a vertical transverse section taken along the line 2—2 of Fig. 1.
Figure 3:
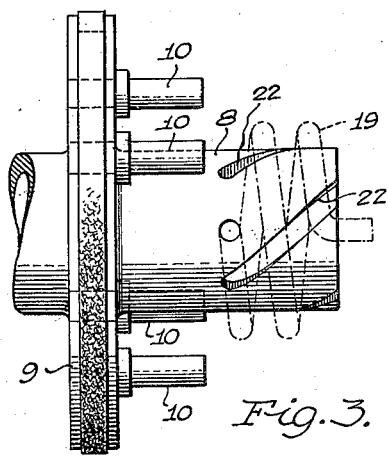
Figs. 3, 4 and 5 are elevations of individual parts in the timing trains.
Figure 4:
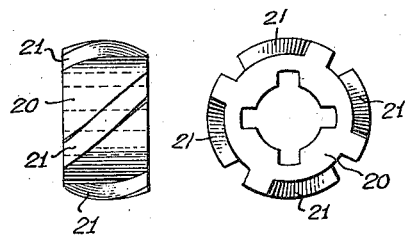
Figure 5:
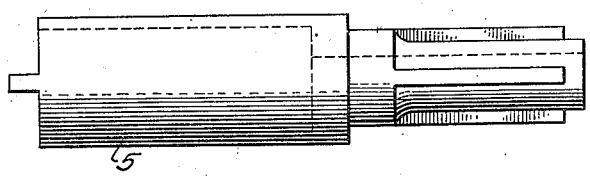

As a damping means, an internally splined collar 20 fits on the splined end of the sleeve 5. This collar carries the spiral tongues 21 for engagement with the slots 22 of the sleeve 8. A spring urges the collar 20 to the right as illustrated in Fig. 1 and upon rotation of the sleeve 8 (counterclockwise, for instance, as illustrated in Fig. 2) the tongues ride to the left (Fig. 1) in their grooves 22. This gives a combined spring and frictional damping at the crankshaft connection.

However, the primary service of collar 20, with its tongues 21, and slots 22 of sleeve 8, is that of a driving connection between the crank and cam shafts. As will be understood, the tongues 21 of the collar will, in any position of the collar, engage the walls of the slots 22. Since the collar 20 is itself positively driven by the crank-shaft and at crankshaft speed, while sleeve 8 is fixedly connected to the gear train leading to the cam shaft, it will be understood that direct drive conditions will exist between the tongues and slot walls at all times, and thereby provide a constant drive relationship between the crank and cam shafts, a relationship which is disturbed only as to speed, and then only during the period when the collar is shifting from one position to another, and during which period the speed relationship between the shafts will change momentarily to permit the advance or retardation of sleeve 8 relative to the crankshaft—during the shift the drive relationship remains constant, and in the new position of the collar the speed relationship again becomes normal. During the period of change in collar position, the friction between the tongues 21 and slots 22 provides the damping effect referred to.

The timing means comprises a distributor shaft 24 driven from the cam shaft 17 for operation of distributor points 25 against contacts 26. The distributor construction may be of any conventional or special design, the essential feature being that it be driven in some way, as by the cam shaft, so that a change in valve timing will cause a corresponding change in ignition timing. As illustrated, a variable movement rotation of the cam shaft 17 with respect to the crankshaft 2 causes a corresponding rotation of the distributor shaft 24 so that earlier opening of the valves 19 will be accompanied by earlier ignition. The distributor being driven also by the train 16, 15, 8 will obtain equal benefits of the damping means 20, 21, 22, 23.

To this point the valves and ignition are varied in timing solely according to crankshaft speed, the control being constantly active. In order to modify this timing control the sleeve 8 has a disc 33 integral therewith for residence in a chamber 34. A plunger 27 carrying a friction element 28 is slidably fitted into a cylinder 29 integral with the wall of the chamber 26 and the element is urged by a spring 30 toward the direction of contact with the peripheral surface of the disc 25. The cylinder 29 is connected by a line 31 to the interior of the intake manifold 32 for subjection of the plunger 27 to the pressure therein. It is, of course, known that the pressure in the manifold 32 varies according to engine loading and according to the rate of loading so that during positive acceleration, for instance, the pressure approaches atmospheric and it drops after having attained a given speed. The pressure will vary from one speed to another. During positive acceleration the pressure rises which tends to balance the pressure at each side of the plunger 27 so that frictional element 28 may contact the disc 33 and hence retard advancement of the valves and ignition timing. As the positive acceleration is decreased and a constant speed attained, the pressure in the manifold drops, the plunger 27 and element 28 is retracted and the speed then governs the ignition and the valve timing through the weights 12.

At speeds approaching maximum, the pressure in the manifold decreases and hence opposes advance of valve and ignition timing as the weights call for more advance at maximum speed than may be desired in some engines.

From this it will be understood that the timing is subject to speed control constantly, but that, through the braking effect of element 28 on disc 33, this control may be modified by a retardation of the advance which the weights would provide if the braking action would be absent. The activity of the brake action is dependent upon the value of the pressure in the intake manifold, as explained, with the spring 30 co-operating with the value to determine such period of activity of the braking element 27. Hence, this control effect is rendered active intermittently and is superposed upon the constant speed control activity to obtain greater accuracy in timing.

What I claim is:—

1. In an internal combustion engine, the combination with valves and valve actuating means therefor, of means for varying the timing of said valves according to the speed of and load on the engine, the timing control responsive to speed being constantly active, activity of the load control being intermittent and dependent upon pressure conditions in the intake manifold.

2. In an internal combustion engine, the combination of a crankshaft, a cam shaft driven by said crankshaft in a given rotational relation, a first means for varying said relation according to the speed of said crankshaft, and a second means for modifying said first means according to the load on the engine.

3. In an internal combustion engine, a crank shaft, a cam shaft driven by said crank shaft in a given rotational relation, speed responsive means for varying said relation, and means sensitive to the pressure in the inlet manifold of the engine for modifying the effect of said speed responsive means.

4. In an internal combustion engine having an inlet manifold, a crankshaft, a camshaft driven by said crankshaft in a given rotational relation, an ignition device rotatable from said camshaft, centrifugal means for altering said rotational relation thereby varying the timing of said valves and of the ignition according to engine speed, and means for modifying the timing of said valve and of said ignition according to the vacuum in the inlet manifold.

5. In an internal combustion engine having an inlet manifold, a crankshaft, a camshaft driven by said crankshaft in a given rotational relation, an ignition device rotatable from said camshaft, centrifugal means rotating at crankshaft speed for altering said rotational relation thereby varying the timing of said valves and of said ignition according to engine speed, and means for modifying the timing of said valves and of said ignition as a function of the pressure in the inlet manifold.

6. In an internal combustion engine, and in combination, inlet and exhaust valves and actuating means therefor, and means for controlling the timing of said valves, said control means being constantly responsive to variations in engine speed to maintain a definite phase relation between the timing of the valves and the engine speed during constant engine speed conditions and to vary the timing of the valves in response to engine speed variations, said control means being additionally responsive intermittently to load variations on the engine to control the rate of timing change.

7. A combination as in claim 6 characterized in that the control means is operatively connected with the intake manifold of the engine and subject to variations in pressure value therein, with the means including a braking structure responsive to changes in such pressure values.

8. A combination as in claim 6 characterized in that the valve actuating means includes a driving element rotatable with and relative to the crank shaft of the engine, operative connections between the element and the crank shaft operative to provide element drive both with and relative to the crank shaft in response to speed conditions of the crank shaft, said control means being operatively connected with the intake manifold of the engine and subject to variations in pressure value therein, said control means including a braking structure co-operative with the driving element and responsive as to activity to the variations in such pressure values.

9. In an internal combustion engine, and in combination, inlet and exhaust valves and actuating means therefor, and means for controlling the timing of said valves to provide a definite timing phase relationship with the engine speed under constant speed conditions, said valve actuating means including a cam shaft and a driving element therefor, means for controlling the timing by control of the element rotation by the crank-shaft of the engine, said control means including centrifugal means operatively connecting the element and crank-shaft to drive the former by the latter with the connections permitting limited angular relative movement between element and crank-shaft while maintaining drive relationship therebetween, said relative movement being responsive to speed variations of the crank-shaft to vary the timing of the valves in maintaining the phase relationship, and means co-operative with said element and responsive to such element relative movements for controlling the rate of change in angular position of the element.

10. A combination as in claim 9 characterized in that the co-operative means is of spring and frictional characteristic.

11. A combination as in claim 9 characterized in that the co-operative means is of frictional characteristic active during periods of speed variation of the crank shaft and tending to oppose change of speed of the driving element to thereby control the rate of speed change of the element.

12. A combination as in claim 9 characterized in that the centrifugal means includes two pairs of weights with the weights of one pair differing as to freedom of response to speeds, said weights being operatively connected with the driving element with the connections similar for each weight, whereby the angular displacement of the element is determined by the combined effect of both pairs and as a resultant of the differential in weight movements provided by speed changes of the crank shaft.

13. A combination as in claim 9 characterized in that the co-operative means includes a spring having its opposite ends subject respectively to the speeds of rotation of the crank shaft and the element.

14. A combination as in claim 9 characterized in that the co-operative means includes a member rotative with the crank-shaft and co-operative with the driving element to provide axial movement of the member during the speed transition period of speed change and to concurrently provide a frictional component opposing such change in axial position of the member.

15. In an internal combustion engine, and in combination, a crank shaft, a cam shaft adapted to operate in varied phase relationship with the crank-shaft, and drive connections between the crank and cam shafts, said connections including a pair of members axially-alined, one of said members being in unvaried phase relation to the crank-shaft and with one of the members shiftable on its support in the direction of member axis and in a path of fixed relationship to the axis of its support, said members carrying complemental formations co-operative to provide a constant drive relationship between them with the angular relationship between them variable by the shifting movement of the shiftable member, whereby member shifting will vary the phase relationship between the crank and cam shafts, means responsive to crank-shaft speed for determining the position of the shiftable member, and means responsive to predetermined variations in depression values of the engine intake manifold for controlling the effective value of the speed responsive means in positioning the shiftable member.

16. A combination as in claim 15 characterized in that the complemental formations provide an assembly of spline characteristic with the spline extending in the direction of length of but angular to the axis of the shiftable member support.

17. A combination as in claim 15 characterized in that the shiftable member phase relation to the crank shaft is unvaried, the phase relationship of the other member being in correspondence with that of the cam shaft.

18. A combination as in claim 15, characterized in that the speed responsive means is in the form of weights responsive to crank shaft speed, said weights being operatively connected to the non-shiftable member in a manner to cause the complemental formations to shift the shiftable member axially to vary the angular relationship between the members, the drive relationship being constant between the members throughout the range of shifting movement.

HERBERT L. DUNCAN.